Figure 1:
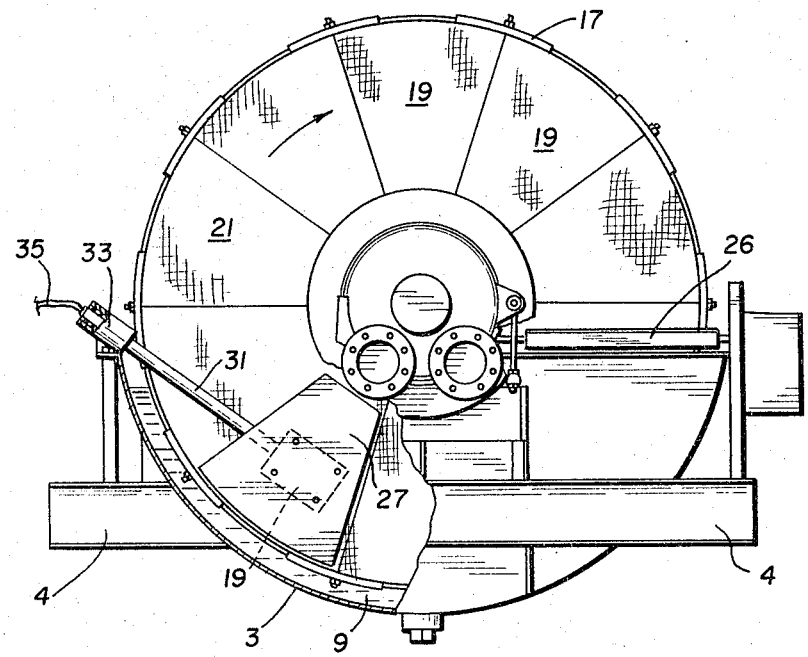

May 2, 1967  A. C. DAMAN  3,317,050
ELECTRICAL VIBRATING AGITATORS FOR ROTARY DISC FILTERS
Filed June 19, 1964  3 Sheets-Sheet 1

INVENTOR.
Arthur C. Daman
BY
McGrew and Edwards
ATTORNEYS

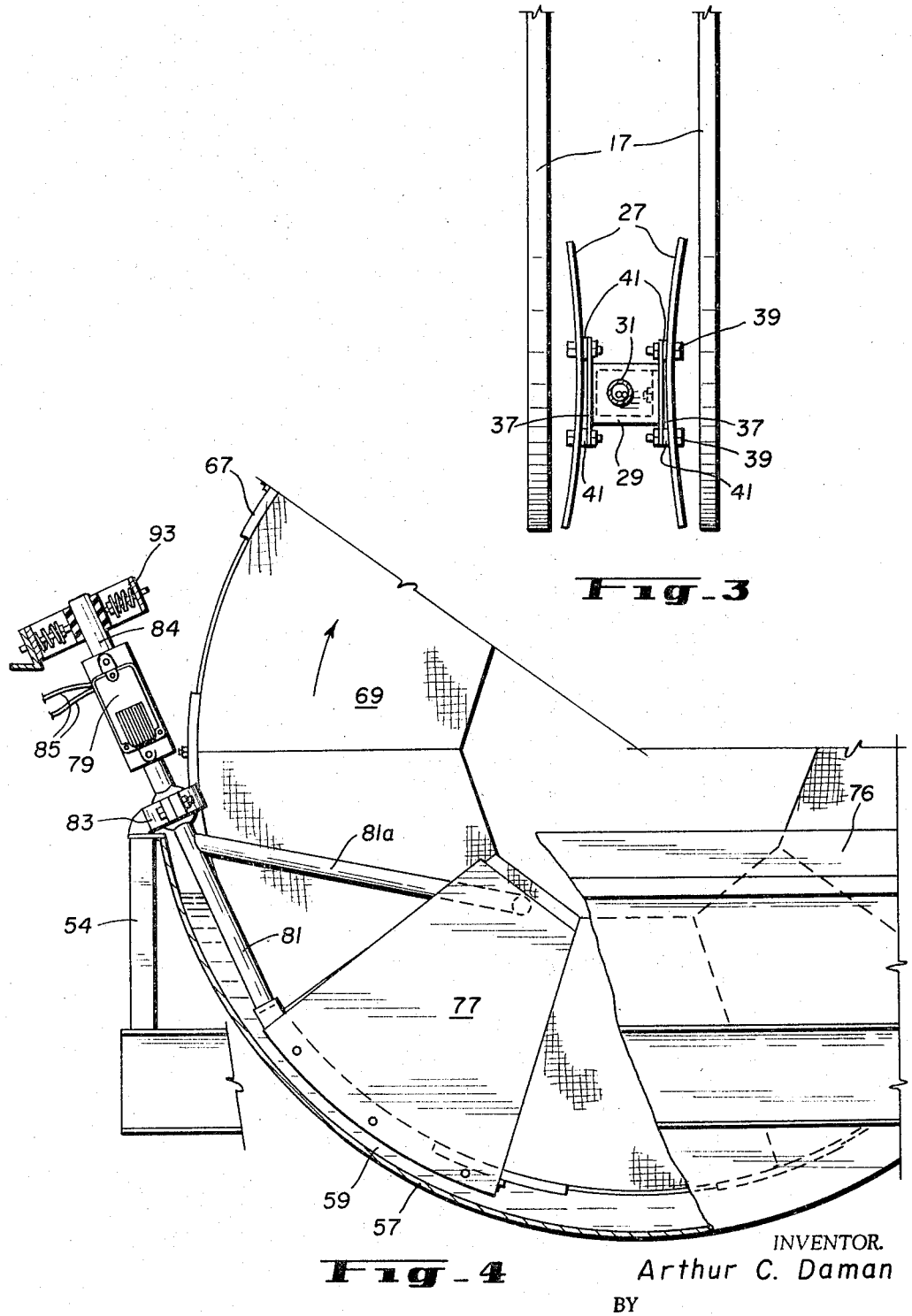

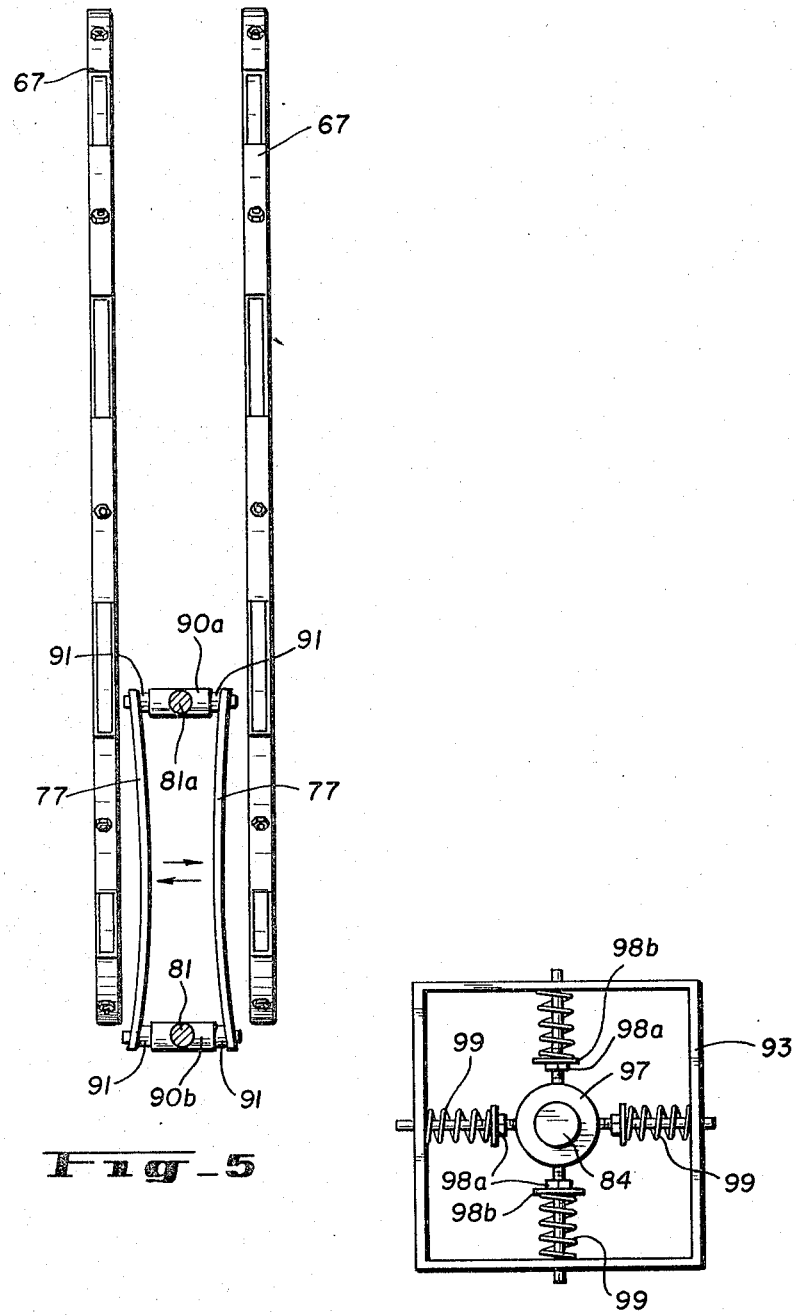

United States Patent Office 3,317,050
Patented May 2, 1967

---

3,317,050
ELECTRICAL VIBRATING AGITATORS FOR ROTARY DISC FILTERS
Arthur C. Daman, Denver, Colo., assignor to Denver Equipment Company, Denver, Colo., a corporation of Colorado
Filed June 19, 1964, Ser. No. 376,440
11 Claims. (Cl. 210—331)

This invention relates to filters and more particularly to disc-type filters incorporating agitation means to improve the filtering action.

Prior art disc-type filters incorporating agitation means have heretofore relied on rotating shafts with paddles, upright or vertical shafts with propellers, or relatively slow moving plates sweeping lengthwise or vertically of the tank near the rotating filter sectors. These plates are pivotally mounted requiring substantial displacement in the sweeping stroke and are driven through camming mechanisms by a simple rotary drive.

The object of this invention, therefore, is to provide a high frequency electrical vibrator system to improve the filtering action in a disc-type filter.

Another object of this invention is to provide a high frequency electrical vibrator system for disc-type filters having separate sources of vibration for adjoining filter sectors and the end filter sectors.

Another object of this invention is to provide high frequency electrical vibration to compact the cake requiring slight displacement of the agitator portion adjoining the filter sectors which will uniformly compress the cake on the entire adjoining filter sector.

A further object of this invention is to provide high frequency electrical agitation of the slurry in the tank of a disc-type filter to keep the particles in suspension without materially interfering with the cake formed on the filter sectors.

Accordingly, this invention provides a series of elongated concave plates disposed in the slurry upwardly in the direction of rotation in pairs between adjoining parallel rotating discs and singly between the tank end walls and each end disc. These singles and pairs of plates are fixedly pivoted or supported at the upper edge of the tank and each pair and single are driven by separate high frequency electrical vibrators. Each plate is of the same size and shape as the filter sector on the adjoining rotating disc so that maximum vibration is imparted to the slurry therebetween to compact the cake uniformly over the entire filter sector. In addition, the high frequency vibratory movement imparted to the plates maintains the particles of the slurry in suspension. A high frequency vibrator may be mounted directly on the pairs or singles of the plates in the slurry, or exteriorly of the slurry. Adjustment of the direction of vibrational impact can be adjusted in the latter arrangement.

Other objects, advantages, and capabilities of the invention will become apparent from the following description, taken in conjunction with the accompanying drawings showing preferred embodiments of the invention.

Figure 2:
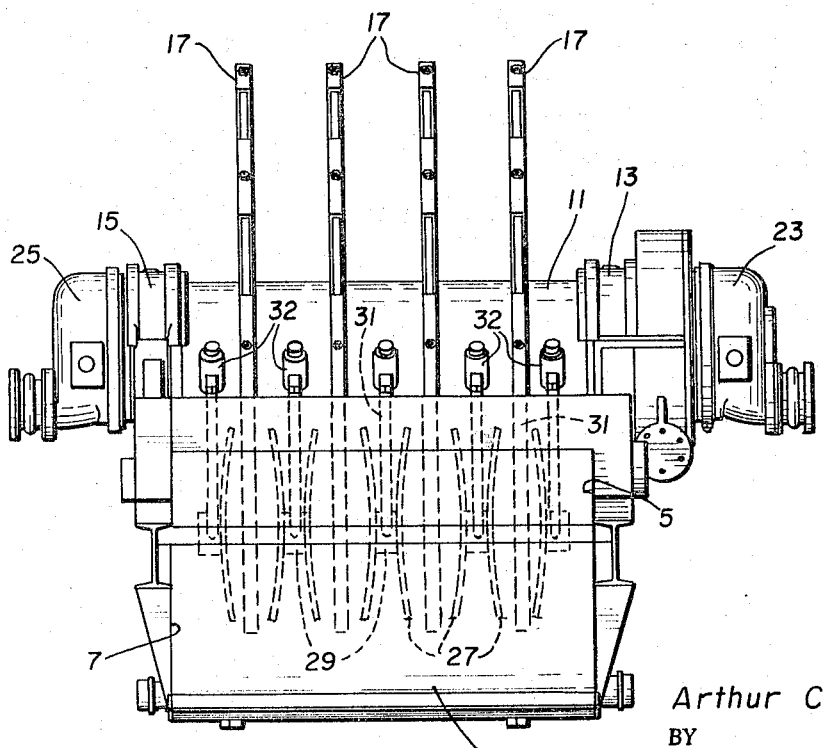

In the drawings:
FIG. 1 is an end elevation view partially in section of the disc-type filter incorporating the vibrating system according to this invention;
FIG. 2 is a side elevation of the disc-type filter shown in FIG. 1 illustrating the arrangement of the mounting of the plates and vibrators in the tank;
FIG. 3 is an enlarged fragmentary front elevation showing the discs, plates and vibrator mounting shown in FIG. 2;
FIG. 4 is a fragmentary end elevation view of the disc-type filter incorporating another embodiment of the vibratory system;
FIG. 5 is an enlarged fragmentary front elevation showing the discs, plates and vibrator connection shown in FIG. 4; and
FIG. 6 is an enlarged plan view of the upper support.

Referring to FIGS. 1 and 2 there is shown a conventional disc-type filter having a tank 3 with support structure 4 for mounting the tank in an upright position. Tank 3 includes oppositely disposed end walls 5 and 7 shown enclosing a quantity of slurry 9 for purposes of illustration. A shaft member 11 containing passages from valve members 23 and 25 to sectors 19 is rotatably supported in bearings 13 and 15 arranged at the opposite end walls 5 and 7, respectively. Shaft member 11 has a plurality of discs 17 attached thereto at spaced intervals for rotation therewith between end walls 5 and 7 of tank 3.

Each disc 17 includes a plurality of radially adjoining filter sectors 19. Filter media 21 such as cloth covers each sector 19. Valves 23 and 25 are arranged outside of bearings 13 and 15. These valves control the vacuum created in sectors 19 of each disc 17 during rotation through slurry 9 in a manner well known in the filter art. The details of valves 23 and 25, therefore, have not been illustrated. During rotation of sectors 19 through slurry 9, cakes of solids are formed on the filter media 21 covering each sector 19. A scraper 26 mounted on suitable support structure in a conventional manner removes the formed cake from each sector 19 as it passes scraper 26.

A series of elongated concave plates 27 are fixedly suspended in a submerged position in the slurry 9 upwardly in the direction of rotation of discs 17. Pairs of plates 27 are disposed between adjoining discs with the concave surfaces oppositely disposed and vibrators 29 mounted therebetween. Singles of plates 27 are disposed between tank end walls 5 and 7 and the discs 17 adjoining these end walls with the concave faces facing the disc and the vibrator 29 mounted on the opposite side adjacent the end walls. The suspension for each pair and single plate includes a tube 31 attached to the vibrator 29 at one end with the opposite end fitting through a resilient sleeve 33 mounted directly on the upper portion of tank 3. The electrical leads 35 extend from vibrator 29 through tube 31 to an exterior source of power supply. Each vibrator unit 29 is of the hermetically sealed type to facilitate operation in the submerged position.

Plates 27 are generally elongated, fan-shaped and concave. Each plate 27 is similar to size and shape to the adjoining filter sector 19 and is therefore considered coextensive therewith. This coextensive arrangement between the plate 27 and adjoining filter sector 19 produces a uniform compressive effect over the surface of the filter media covering the sectors 19, thereby increasing the amount of cake which can be ultimately carried by each filter sector 19.

In FIG. 3 the mounting of the vibrator unit 29 between pairs of plates 27 and the relationship between the plates 27 and discs 17 is more clearly illustrated. Vibrator unit 29 is of generally rectangular shape and includes flanges 37 with holes at each corner for receiving four bolt and nut assemblies. Bolt and nut assemblies 39 fasten a pair of plates 27 to opposite sides of vibrator 29. A washer spacer 41 is positioned on each bolt and nut assembly between flange 37 and plates 27. The thickness of washers 41 can be varied to adjust the distance between a plate 27 and disc 17.

The suspension of each single and pairs of plates 27 is referred to as fixed, in that each plate through the vibrator 29, tube 31 and sleeve 33 is fixedly connected to the tank 4. When the electrical power is supplied through line 35 to each individual vibrator 29 a high frequency vibratory movement will be imparted to each single and pair of plates 27. This vibratory movement in turn imparts a compacting or compressing force on the cake which is collecting on the adjoining filter sector 19 thereby increasing the amount of cake which each sector 19 may carry per revolution.

In addition, this high frequency vibratory action imparted to plates 27 agitates the particles of the slurry 9, maintaining them in suspension to further improve the filtering action. It is apparent that from the resilient mounting of each single or pair of plates 27 the actual displacement of each plate is relatively slight which materially reduces the chances of disturbing already formed cake, yet effectively maintains the particles of slurry in suspension. The term "high frequency" as herein referred to includes that frequency of the 60 cycle per second mechanical vibrators and which will impart a substantially higher frequency movement than conventional mechanical agitators such as for example 3600 cycles per second.

Another embodiment of the invention is illustrated in FIGS. 4 and 5. As previously described, referring to FIGS. 1 and 2, the disc-type filter includes a tank 59 maintained in an upright position by support structure 54, all of which is shown only for purposes of illustration. A plurality of spaced discs 67 extend lengthwise of the tank, each disc having radially adjoining filter sectors 69 with interior vacuum portions and covered by filter media to accumulate a cake of solids during rotation through slurry 59. A scraper 76 removes the cake during one portion of the revolution.

A series of plates 77 are suspended from the upper edge of tank 53 and are disposed upwardly in the direction of rotation of discs 67 in a submerged position. As in FIGS. 1 and 2, pairs of plates 77 are disposed between adjoining discs with the concave surfaces oppositely disposed and singles disposed between tank end walls with the concave surfaces facing the disc. The plate suspension of FIGS. 4 and 5 for each single and pair of plates 77 includes a ball and socket joint 83 mounted at the upper portion of tank 53. Connected to the lower end of the ball and socket joint 83 is a support rod 81 extending to the lower end of plate 77 with an arm 81a extending to the upper end of plate 77, the physical connection being more fully described in reference to FIG. 5 hereinafter.

The opposite end of ball and socket joint 83 is connected to a support rod 84 to which is attached a high frequency electrical vibrator 79. The upper end of rod 84 fits into a spring mounted support 93 more fully described in reference to FIG. 6 hereinafter.

FIG. 5 shows the relationship of pairs of plates to adjoining disc 67. Plates 77 are elongated, concave, and fan-shaped and are coextensive with adjoining filter sectors 69, in that they are of the same size and shape as referred to in the above discussion of FIG. 1.

Pairs of plates 77 are arranged with concave surfaces oppositely disposed and facing the adjoining discs. They are connected at their upper and lower ends by blocks 90a and 90b, respectively, and four bolts 91 which extend through the plate into the blocks. Between each bolt and block there is a replaceable spacer 91 for adjusting the distance between the plate and adjoining disc. Blocks 90a and 90b are attached to arm 81a and rod 81, respectively, for connecting the upper and lower ends of parallel plates through bolt and socket joint 83 to exteriorly mounted vibrator 79 so that actuation of vibrator 79 will impart a high frequency vibratory movement to the pair of plates 77.

The single plate 77 between the end wall and end disc is positioned the same as shown in FIG. 2 with the concave surface facing the end disc and is of similar shape as the adjoining disc sector 69. The mounting of the single plate 77 in the embodiment of FIGS. 4 and 5 will be similar to the pair above described with the vibrator mounted exteriorly of the tank.

The details of adjusting support 93 are further illustrated in FIG. 6. A frame 95 of substantially square shape has a sleeve 97 centrally disposed therein. Sleeve 97 directly connects to vibrator 79 through rod 84. Four spring members position sleeve 97 within frame 95. Each spring member comprises a threaded rod 98 extending through a side of frame 95 with a nut 98a threaded thereon and a washer 98b behind spring 99. Adjustment of one of the four nuts 98a will compress or expand the associated spring 99. By adjusting one or all of nuts 98a, the direction of the vibratory movement generated by vibrator 79 and imparted through ball and socket joint 83 and rod 81 to plate 77 can be effectively altered. This provides a convenient means for varying the direction of vibratory effect on the adjoining filter sectors and that imparted to the slurry particles and thereby provides a novel way of controlling the cake formation thereon.

Since vibrator 79 is mounted exteriorly of the tank, it is unnecessary to require hermetically sealed units as is vibrator 29 shown in the embodiment in FIG. 1. When the electrical power is supplied through line 85 to each individual vibrator 29, a high frequency vibratory movement will be imparted to each single and pair of plates 77. Vibratory movement imparted to plates 77 will compress the cake on adjoining filter sectors and agitate the particles in the slurry maintaining them in suspension.

In either embodiment illustrated in this invention, it is apparent that the frequency of vibration of each pair or single could be different as it is dependent on the frequency of each individually mounted vibrator unit. In the preferred embodiments, it is preferred that the same frequency of vibration will be used in all vibratory units.

Various modifications may be made in the invention without departing from the spirit and scope thereof, and it is desired, therefore, that the scope of the invention shall be as set forth in the hereunto appended claims.

I claim:

1. In a disc-type filter including a tank for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced elongated fan-shaped plates extending lengthwise of the tank disposed in a submerged position in the slurry in proximate relation to an adjoining filter sector, each plate being substantially coextensive with adjoining filter sectors, means for mounting said plate for vibratory movement so as to keep particles of the slurry in suspension and compress the cake on the filter sector, said mounting means inclusive of plural rod-like members, each having an end portion connected to at least one of said plates and another portion distant from said end portion connected by a coupling member to a stationary surface on the filter, and an electric vibrating means connected to each of said rod-like members and its associated one of said plates to individually impart a high frequency vibratory movement thereto.

2. In a disc-type filter including a tank for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, concave, elongated fan-shaped plates extending lengthwise of the tank disposed in a submerged position in the slurry upwardly in the direction of rotation in proximate relation to an adjoining filter sector, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to at least one of said plates and another portion distant from said end portion connected by a coupling member to a stationary surface on the filter, and an electric vibrating means connected to each of said rod-like members and its associated one of said plates to individually impart a high frequency vibratory movement thereto.

3. In a disc-type filter including a tank for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, elongated fan-shaped plates extending lengthwise of the tank disposed in a submerged position in the slurry in proximate relation to an adjoining filter sector, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to at least one of said plates and another portion distant from said end portion connected by a coupling member to a stationary surface on the filter, and a hermetically sealed electric vibrating means supported on each of said plates to individually impart a high frequency vibratory movement thereto.

4. In a disc-type filter including a tank for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, elongated fan-shaped plates extending lengthwise of the tank disposed in a submerged position in the slurry in proximate relation to an adjoining filter sector, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to at least one of said plates and another portion distant from said end portion connected by a coupling member to a stationary support structure at the upper end of the tank, and an electric vibrating means connected to each of said rod-like members and its associated one of said plates to individually impart a high frequency vibratory movement thereto.

5. In a disc-type filter including a tank having oppositely disposed end walls for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, elongated fan-shaped plates extending lengthwise of the tank disposed in a submerged position in the slurry with at least one pair of said plates between adjoining discs and singles of said plates between each end wall and a disc, each plate being substantially coextensive with adjoining filter sectors, means for mounting said plates for vibratory movement so as to keep particles of the slurry in suspension and compress the cake on the filter sector, said mounting means inclusive of plural rod-like members, each having and end portion connected to said pairs and singles of said plates and another portion distant from said end portion connected by a coupling member to a stationary surface on the filter, and an electric vibrating means connected to each of said rod-like members and its associated pairs and singles of said plates to impart a high frequency vibratory movement thereto.

6. In a disc-type filter including a tank having oppositely disposed end walls for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced elongated fan-shaped plates extending lengthwise of the tank disposed in a submerged position in the slurry, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to at least one of said plates and another portion distant from said end portion connected by a coupling member to a stationary surface on the filter, and plural electric vibrators each connected to one of said rod-like members and its associated of said plates to individually impart a high frequency vibratory movement thereto.

7. In a disc-type filter including a tank having oppositely disposed end walls for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, concave elongated fan-shaped plates extending lengthwise of the tank and disposed in a submerged position in the slurry upwardly in the direction of rotation in proximate relation to an adjoining filter sector, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to at least one of said plates and another portion distant from said end portion connected by a coupling member to a stationary surface on the filter, and an electric vibrating means mounted on each of said plates to individually impart a high frequency vibratory movement thereto.

8. In a disc-type filter including a tank having oppositely disposed end walls for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, concave, elongated fan-shaped plates extending lengthwise of the tank and disposed in a submerged position in the slurry upwardly in the direction of rotation in proximate relation to an adjoining filter sector with at least one pair of said plates between adjoining discs and singles of said plates between each end wall and a disc, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to said pairs and singles of said plates and another portion distant from said end portion connected by a coupling member to a stationary surface on the filter, and plural electric vibrators each connected to each of said rod-like members through its associated joint to each of said pairs and said single plates to individually impart a high frequency vibratory movement thereto.

9. In a disc-type filter including a tank having oppositely disposed end walls for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, concave, elongated fan-shaped plates lengthwise of the tank disposed in a submerged position in the slurry upwardly in the direction of rotation with pairs of said plates having the concave surfaces oppositely disposed between adjoining discs and singles of said plates between each end wall and a disc, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to one of said plates and another portion distant from said end portion connected to a resilient sleeve coupling member mounted on stationary support structure at the upper end of the tank, and hermetically sealed electric vibrating means mounted on each of said pair and singles of said plates to individually impart a high frequency vibratory movement thereto.

10. In a disc-type filter including a tank having oppositely disposed end walls for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced, concave, elongated fan-shaped plates extending lengthwise of the tank disposed in a submerged position in the slurry upwardly in the direction of rotation with pairs of said plates having the concave surfaces oppositely disposed between adjoining discs and singles of said plates between each end wall and a disc, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to at least one of said plates and another portion distant from said end portion connected to a ball and socket joint coupling member mounted on stationary support structure at the upper end of the tank, plural electric vibrators each connected through its associate joint to its associated one of said pairs and said single plates to impart a high frequency vibratory movement thereto, and means for adjusting the direction of the vibratory movement.

11. In a disc-type filter including a tank for slurry and a shaft supported for rotation adjacent the top of the tank, the shaft supporting a plurality of spaced discs, each having a plurality of radially adjoining filter sectors, filter media covering the exterior surface of each sector, and means for producing a vacuum within the sectors for forming a cake of solids on each filter media during rotation through the slurry, the improvement comprising a series of spaced plates extending lengthwise of the tank and disposed in a submerged position in the slurry in proximate relation to an adjoining filter sector, each plate being substantially coextensive with adjoining filter sectors, means for mounting said plates for vibratory movement so as to keep particles of the slurry in suspension and compress the cake on the filter sector, said mounting means inclusive of plural rod-like members, each having an end portion connected to at least one of said plates and another portion distant from said end portion connected by a coupling member to a stationary surface on the filter, and an electric vibrating means having a vibrating frequency of at least 60 cycles per second and connected to each of said rod-like members and its associated one of said plates to individually impart a high frequency vibratory movement thereto.

References Cited by the Examiner

UNITED STATES PATENTS

| | | | |
|---|---|---|---|
| 576,878 | 2/1897 | Mitchell | 210—388 X |
| 2,899,066 | 8/1959 | Peterson et al. | 210—383 |
| 2,932,402 | 4/1960 | Logue et al. | 210—383 |

REUBEN FRIEDMAN, *Primary Examiner.*

F. SPEAR, *Assistant Examiner.*